United States Patent
Petzold et al.

(10) Patent No.: US 7,635,317 B2
(45) Date of Patent: Dec. 22, 2009

(54) METHOD FOR ESTABLISHING MALFUNCTIONS OF COMPONENTS OF A MOTOR VEHICLE POWER TRAIN

(75) Inventors: Rainer Petzold, Friedrichshafen (DE);
Werner Wolfgang, Ravensburg (DE);
Thomas Jäger, Meckenbeuren (DE);
Mario Steinborn, Friedrichshafen (DE);
Rupert Kramer, Friedrichshafen (DE);
Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 315 days.

(21) Appl. No.: 11/327,853

(22) Filed: Jan. 9, 2006

(65) Prior Publication Data
US 2006/0154783 A1  Jul. 13, 2006

(30) Foreign Application Priority Data
Jan. 13, 2005  (DE) .................. 10 2004 001 524

(51) Int. Cl.
*F16H 61/12*  (2006.01)
(52) U.S. Cl. .................................... 477/115; 477/906
(58) Field of Classification Search .................. 477/73, 477/84
See application file for complete search history.

(56) References Cited

U.S. PATENT DOCUMENTS

| | | | |
|---|---|---|---|
| 4,671,235 A | 6/1987 | Hosaka | |
| 5,928,110 A | 7/1999 | Vornehm et al. | |
| 6,490,511 B1 | 12/2002 | Raftari et al. | |
| 6,846,260 B2 | 1/2005 | Horiuchi | |
| 6,948,395 B2 | 9/2005 | Gierer et al. | |
| 2004/0010361 A1* | 1/2004 | Gierer et al. ................. 701/62 |
| 2004/0034460 A1 | 2/2004 | Folkerts et al. | |

FOREIGN PATENT DOCUMENTS

| | | |
|---|---|---|
| DE | 195 13 695 A1 | 10/1996 |
| DE | 102 57 139 A1 | 9/2003 |
| DE | 102 31 819 A1 | 2/2004 |
| EP | 1 177 927 A2 | 2/2002 |
| GB | 2 370 867 A | 7/2002 |

* cited by examiner

*Primary Examiner*—Sherry L Estremsky
*Assistant Examiner*—Edwin A. Young
(74) *Attorney, Agent, or Firm*—Davis & Bujold, P.L.L.C.

(57) ABSTRACT

A method for establishing malfunctions of components of a motor vehicle power train as well as the reaction to the same. The power train has a drive motor and an automatic transmission with respectively allocated control devices, setting apparatus and sensors, and the transmission input shaft is allocated a torque sensor for recording the transmission input shaft. During operation of the motor vehicle, the functions of the control devices, the operating elements, the sensors and their data transmission apparatus as well as the measured values of the transmission input torque are recorded and checked for signs of malfunction. After recognizing such a malfunction, operations are conducted by means of which the motor vehicle can be further operated in an emergency type of operation or with the aid of which the driving operation can be safely ended.

17 Claims, 1 Drawing Sheet

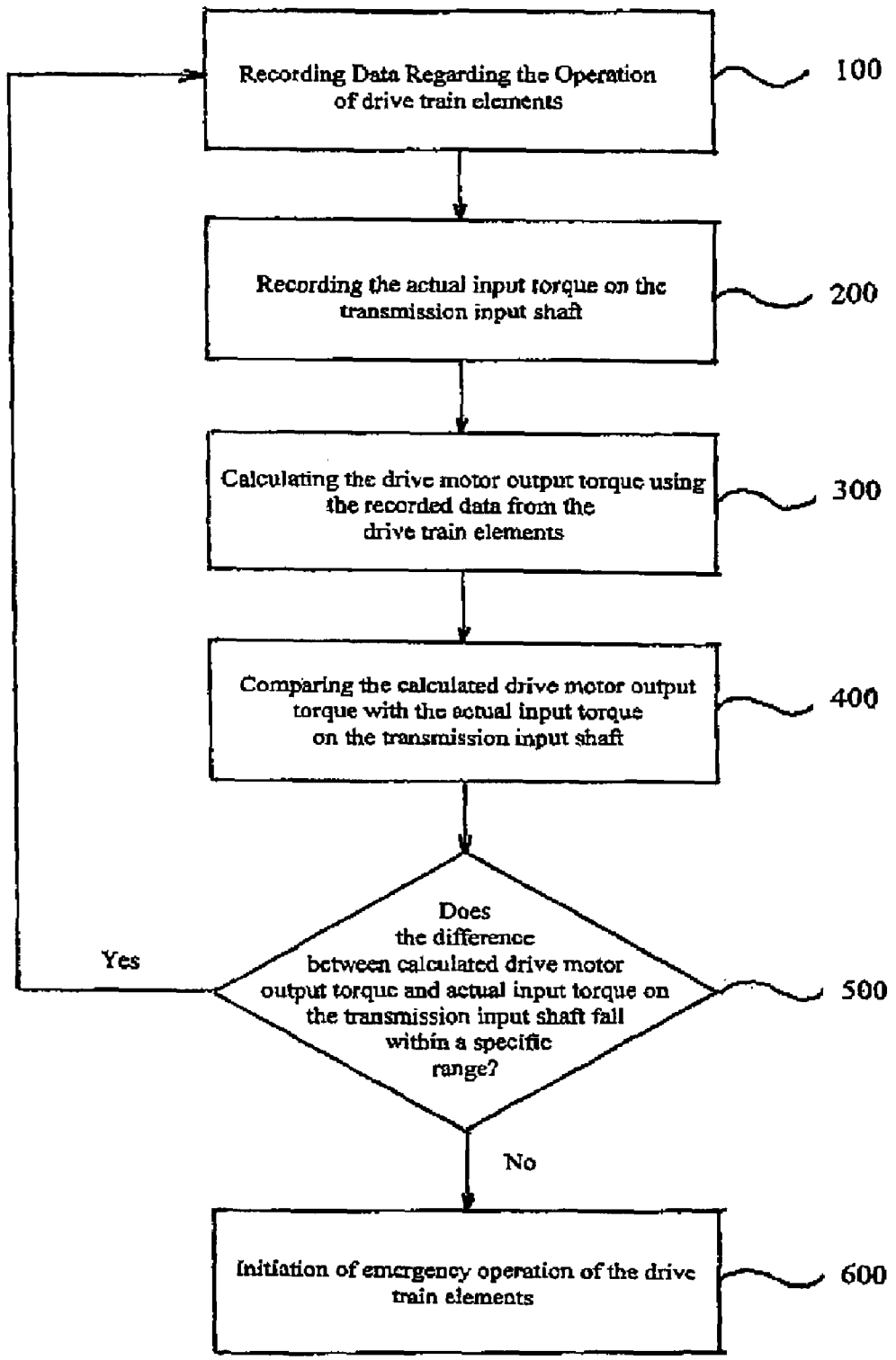

METHOD FOR ESTABLISHING MALFUNCTIONS OF COMPONENTS OF A MOTOR VEHICLE POWER TRAIN

This application claims priority from German Patent Application Serial No. 10 2005 001 524.7 filed Jan. 13, 2005.

FIELD OF THE INVENTION

The invention concerns a method for establishing malfunctions of components of a motor vehicle power train as well as for the reaction to the same.

BACKGROUND OF THE INVENTION

It is well known that the value of the current motor rotational torque is needed for many control and regulation functions. This current motor torque value is traditionally calculated in the motor control device on the basis of vehicle-specific as well as driving situation-specific values and is made available to other control devices through electronic interfaces (CAN-Bus). A transmission control device which triggers on the basis of stored control and/or regulation programs in an automatic transmission with which the activation of a shifting and starting clutch and/or final control elements in an automatic transmission to implement gear ratio change processes can be triggered also belongs to these control devices.

The motor torque value calculated by the motor control device, usually on the basis of the motor rotational speed, the fuel injection amount and other parameters, is at least too inexact for the control and regulation of an automatic transmission. Hence the calculated motor torque value can deviate more or less strongly from the actual motor torque value on the basis of influences, for example by a motor-side auxiliary unit drive, due to ventilator losses, due to dynamic effects, due to various loading pressures of the internal combustion machine and/or due to various ambient air pressure. Increases in torque belong to the dynamic effects if, for example, the motor rotational speed declines on the basis of an increased driving resistance and all rotating parts of the power train act to increase torque with their lagging rotating masses, or torque diminutions if while motor rotational speed is increasing, the inert rotating masses of the power train are first brought to that speed which the drive motor itself has in the sense of a hoisting effect.

A calculated motor torque value does not correspond to the torque incident upon the transmission input shaft due to the converter curve of the torque converter, especially in motor vehicles with an automatic transmission and a hydrodynamic torque converter connected downstream from this in terms of drive engineering. This has as a consequence that even the automatic gear reduction change procedures of the transmission cannot be so optimally conducted as when a measured torque value is available.

Moreover an interruption of fuel to the internal combustion machine can occur during the operation of a motor vehicle. To the extent that the motor torque is calculated, this malfunction has previously remained unconsidered in determining motor torque. The motor control device therefore gives the transmission control device as well as other motor vehicle control devices a falsely calculated motor torque value. If the motor vehicle now is driving on an incline, the transmission recognizes this incline because the motor vehicle becomes slower despite a specified high motor torque.

This situation is usually used by the transmission control device to introduce a downshift process so that a clutch is opened in this regard and the current gear is disengaged. A synchronization of the new speed by raising motor torque is, however, no longer possible due to the lack of fuel. The power train between the drive motor and the transmission is now open and the motor finally remains standing. A steering auxiliary pump driven by the drive motor in this way becomes functionless so that disadvantageously high steering forces are required of the driver.

Reference is made to German Patent 102 57 139 A1 in connection with the inexactitude of the calculated motor torque value mentioned. It is explained at the beginning in this publication that the transmission input torque, the value of the throttle valve opening on the internal combustion machine as well as the motor vehicle speed are frequently used as input magnitudes in connection with automatic transmissions in motor vehicles for controlling precise up and downshifting. Moreover the transmission input torque is estimated on the basis of the motor rotation speed especially with electronically controlled transmissions. These measurements are inexact so that usually torque sensors on the transmission shaft are used to record the transmission input torque precisely.

Moreover a regulating device for the bridging clutch of the converter of an automatic transmission is known from German Patent 195 13 695 A1. The clutch regulating device is outfitted with means for determining target slip values with which the slip rotational speed can be adjusted as a function of the rotational speed of the input element of the clutch, the motor torque and the accelerator activity in continuous slip operation of the bridging clutch to increase the lifetime of the bridging clutch and the converter as well as for diminishing the thermal output performance of the bridging clutch.

It is moreover provided with this regulating device that a torque sensor measures the torque incident upon the crankshaft of the motor vehicle drive motor or the pump side of the torque converter and not perhaps on the transmission input shaft, and makes it available to the regulating facility. It is moreover disclosed in this publication that an emergency type of operation is possible for the converter bridging clutch with the regulating facility. During this emergency type of operation, the target slip value is set to a minimal value if the converter oil temperature has exceeded an impermissibly high value due to a disturbance of the torque bridging clutch or the torque converter.

BRIEF DESCRIPTION OF THE DRAWING

The Invention will now be described, by way of example, with reference to the accompanying figure which is a flowchart of the method of establishing malfunctions of drive train components according to the present invention.

DETAILED DESCRIPTION OF THE INVENTION

Against this background, the invention is based upon the objective of presenting a method for establishing malfunctions of components of a motor vehicle drive train as well as the reaction to the same, with which disturbances on drive train components, their control devices, sensors and/or signal transmission apparatus are recognized and with which an emergency operation of the motor vehicle can be introduced and conducted.

Accordingly the invention proceeds from a method for establishing malfunctions of components of a motor vehicle power train as well as the reaction to the same, whereby the power train has a drive motor and an automatic transmission with respectively allocated control devices, positioning apparatus and sensors, and where the transmission input shaft is allocated a torque sensor for recording the transmission input torque.

It is moreover provided for solving the objective posed that, when the motor vehicle is being operated, the functions of the control apparatus, operating elements of the sensors and their data transmission apparatus as well as the measured values of the transmission input torque are recorded 100, 200 and are checked for signs of malfunction, and that after recognizing such a malfunction, operations are conducted by means of which the motor vehicle can be operated further in an emergency type of operation or with the aid of which the driving operation can be safely ended.

Through this mode of operation, malfunctions can basically be recognized with certainty by the recording and evaluation of the measured values of a torque sensor on the transmission input side of an automatic transmission, and countermeasures can be introduced which enable a safe emergency motor vehicle operation. Such a certain malfunction recognition is not possible through an evaluation of a motor torque value calculated on the basis of other motor vehicle and driving situation characteristic magnitudes, since this is usually encumbered with errors on the basis of the numerous influence magnitudes.

Especially in motor vehicles in which the motor torque value or the transmission input torque is an important basic magnitude for the control and regulation of other power train components, a great significance falls on the exact measurement of this torque. Hence the use of an erroneous motor torque value in controlling the clutch and/or the transmission can lead to uncomfortable and wear-intensive shifting processes. By using a torque sensor on the transmission input shaft, precise torque values are made available on the basis of which, for example, errors in the drive motor itself or even in its control sequences and the motor control device can so to speak be made available in the independent diagnosis, owing to which overall defective functions can be avoided.

In further development of the method of the invention, it is accordingly preferably provided that the measured transmission input torque 200 is communicated to the motor control device and verified as to its plausibility and/or correctness. For example, a torque value which exceeds a specified maximum torque value is not plausible. This verification can, for example, take place in that the measured transmission input torque is compared 400 with a calculated motor torque 300. In the event of impermissibly high deviations between these two torque values 500, an emergency type of operation for the automatic transmission and/or other power train components and/or motor vehicle devices is activated 600. This emergency type of operation will at least affect the control devices of the motor vehicle drive motor and/or the automatic transmission. But preferably other motor vehicle control devices can also operate in an emergency type of operation in this regard. Thus, for example, an air conditioning facility can be shut off in such an emergency operation.

An interruption of the fuel supply to the motor vehicle drive motor can be decided with such a comparison of the measured transmission input torque with the calculated motor torque, or solely by an analysis of the course over time of the transmission input torque. As a consequence of this recognized malfunction, it is provided in the sense of the emergency type of operation mentioned that the transmission control device prohibits gear ratio change processes of the automatic transmission until this malfunction is eliminated. In this way, the drive motor remains engaged in the power train so that, for example, a steering auxiliary pump is driven generating auxiliary force until the motor vehicle stands still. Likewise an exchange of control signals with information containing an interruption of fuel supply can take place between transmission control device and other control devices in the power train, such as, for example, a motor control device or a motor vehicle master computer so that an emergency driving strategy for interruptions in fuel supply is activated.

Of course this analysis of the course over time of the transmission input torque can also be conducted in the transmission control device itself.

It can moreover be provided that the measured values of the torque sensor can be used on the transmission input shaft in order, together with other manipulated variables and rotational speeds (for example, the accelerator deflection angle, the transmission input rotational speed and the transmission output rotational speed) to interpret the wish of the driver with respect to certain transmission gear ration change procedures, even in emergency operation situations, such that a restricted but secure emergency driving operation is possible.

It can thus be provided as an emergency type of operation that after recognition of a malfunction in a data transfer stretch of the control devices, operating elements and/or sensors can on the basis of the course of signals of the torque sensor on the transmission input shaft, an intent to shift signaled by withdrawal of the accelerator (for example, intent to downshift) by the driver is recognized and this downshift, for example, of the transmission is introduced by opening a shift clutch and shifting out of the current transmission gear ratio as well as subsequent closing of the clutch. Then a decision is made on the basis of the course of signals of the torque sensor for the desired motor rotation speed or transmission input speed signaled by the accelerator deflection by the driver for the new, lower gear at the current speed of travel. Subsequently the clutch is opened, the new, lower speed fitting this speed of travel and accelerator deflection is engaged and the clutch is subsequently closed again.

It can be provided in a further configuration of the invention that the malfunction is communicated optically and/or acoustically to the driver, so that the latter can control or accompany the gear shifting by his/her accelerator deflection behavior.

Reference is made to the following driving operation situation by way of example. A signal interface or a signal transmission link between the motor control device and the transmission control device has failed. The driver is optically and/or acoustically informed on this fact and its consequences. While the motor vehicle travels on, the resistance to travel increases due to a rise in the roadway so that the incident motor torque no longer suffices in order to maintain the driving output or driving speed signalized by the driver by the accelerator deflection. A downshifting of the transmission into a lower speed is accordingly necessary.

The driver recognizes the necessity of downshifting. He/she also knows that the automatic transmission can no longer automatically shift in an orderly manner due to the defective connection to the motor control unit. The driver therefore reduces the accelerator deflection so that the torque issued from the drive motor is diminished.

The transmission control device now automatically recognizes the intent to downshift by the driver on the basis of the measured course of torque of the torque sensor, opens the clutch, disengages the current speed and then closes the clutch again. The driver subsequently sets that motor rotational speed or transmission input rotational speed through the deflection of the accelerator at which the speed of travel desired by the driver can be realized in the new and smaller gear speed. Finally the clutch is opened again, the new speed is engaged, and the clutch is closed again. Now the motor vehicle can be driven in the new gear despite the interruption of the communication apparatus between the motor control device and the transmission control device.

Without using the measured values of the torque sensor on the transmission input shaft, the described motor vehicle malfunction would lead to the motor vehicle driving to a standstill in the gear just shifted and subsequently not being capable of being started any more.

The invention claimed is:

1. A method of detecting a malfunctioning drive train component of a motor vehicle and implementing an emergency operation in view of the malfunctioning drive train component, the drive train including a drive motor having a motor control device and a drive motor output shaft and an automatic transmission having a transmission control device, a transmission setting apparatus, a plurality of transmission sensors, and a transmission input shaft having a transmission input shaft torque sensor for measuring values of input torque on the transmission input shaft, the drive motor output shaft being indirectly connected, via a further drive train element, to the transmission input shaft, the method comprising the steps of:

recording, via a data transmission apparatus and during operation of the motor vehicle, function data of the drive motor, the motor control device and the automatic transmission, the transmission control device, the transmission setting apparatus, the plurality of transmission sensors, and the transmission input shaft having the transmission input shaft torque sensor and actual measurement values of the input torque on the transmission input shaft;

calculating an output torque of the drive motor output shaft using the function data of the drive motor, the motor control device and the automatic transmission, the transmission control device, the transmission setting apparatus, the plurality of transmission sensors, and the transmission input shaft having the transmission input shaft torque sensor;

comparing the calculated output torque of the drive motor output shaft with the actual measurement values of the input torque of the transmission input shaft and concluding that at least one of the drive motor, the motor control device and the automatic transmission, the transmission control device, the transmission selling apparatus, the plurality of transmission sensors and the data transmission apparatus has failed if an impermissibly high deviation exists between the calculated output torque from the drive motor and the actual measurement values of the input torque on the transmission input shaft which is indirectly connected to the drive motor output shaft; and initialing an emergency type operation of at least one of the drive motor, the motor control device and the automatic transmission, the transmission control device when a failure is concluded such that the motor vehicle can be at least temporarily safely operated.

2. The method according to claim 1, further comprising the step of communicating the measured transmission input torque to the motor control device and checking the measured transmission input torque for at least one of plausibility and correctness.

3. The method according to claim 2, further comprising the step of activating, in an event of excessively high deviations between the measured transmission input torque and the calculated motor torque, an emergency type operation for at least one of the automatic transmission, other power train components and the motor vehicle devices.

4. The method according to claim 3, further comprising the step of deciding upon an interruption of fuel supply to the motor vehicle drive motor, on a basis of the comparison of the measured transmission input torque with the calculated motor torque or by an analysis of the measured course of torque on the transmission input shaft.

5. The method according to claim 4, further comprising the step of emitting a control signal from the transmission control device, after establishing the interruption of fuel supply, to other control devices in the power train so that the control signal can activate an emergency driving strategy for the interruption of fuel supply.

6. The method according to claim 4, further comprising the step of preventing gear ratio changes in the transmission with the transmission control device, after establishing the interruption of fuel supply, until the malfunction is eliminated.

7. The method according to claim 4, further comprising the step of issuing a control signal from one of the motor control device or a motor vehicle master computer, after establishing the interruption of fuel supply, to the transmission control device which prevents gear ratio change procedures of the automatic transmission until the malfunction is eliminated.

8. The method according to claim 1, further comprising the steps of:

operating at least one of the at least one drive train operating element and the sensors from the course of signals of the torque sensor on the transmission input shaft after recognizing a malfunction in a data transmission link of the control devices;

recognizing an intention to down shift transmission gear ratios by the driver signaled by the retraction of the accelerator deflection; and introducing the down shift of the transmission gear ratios by disengaging a clutch and disengaging a current transmission gear ratio and subsequently engaging the clutch and adjusting one of a desired motor rotational speed or a transmission input rotational speed for a new lower gear ratio at a current speed of travel signaled by the renewed accelerator deflection and finally engaging the new lower gear ratio.

9. The method according to claim 8, further comprising the step of communicating the malfunction optically and acoustically to the driver.

10. A method for determining a malfunction of at least one automotive drive train component and a reaction to the malfunction of the at least one drive train component, the drive train comprising a drive engine with a drive output shaft, a mechanical element and an automatic transmission having a transmission input shaft, the mechanical element being located between the drive engine and the transmission such that the drive output shaft is indirectly connected to the transmission input shaft, each having a control device, actuators, sensors, a data transmission system, and the functions of the control devices, the actuators, the sensors and the data transmission systems of each of the drive engine and the automatic transmission being recorded and checked for signs of malfunction during driving operations, and an emergency operating mode being activated when a malfunction occurs, the method comprising the steps of:

measuring a transmission input torque of the transmission input shaft, via an input shaft torque sensor, and the functions of the control devices, the actuators, the sensors, and a torque of the transmission input shaft being sensed, measured and checked for signs of malfunction during the driving operation;

communicating and checking the measured transmission input torque to the engine control unit for at least one of plausibility and correctness;

implementing process steps upon recognition of a malfunction to either continue safe operation of the vehicle in the emergency operating mode, or safely end operation of the vehicle.

11. The method according to claim 10, further comprising the step of comparing the measured transmission input torque with a calculated engine torque and if there is an excessive deviation between the measured transmission input torque and the calculated engine torque, the emergency operating mode will be activated for at least one of the automatic transmission, the at least one drive train component and a vehicle installation.

12. The method according to claim 11, further comprising the step of inferring an interruption of the fuel supply to the automotive driving engine from either the comparison of the measured transmission input torque with the calculated engine torque or from an analysis of a torque characteristic measured on the transmission input shaft.

13. The method according to claim 12, further comprising the step of sending with the transmission control unit a control signal including interruption of the fuel supply information to other control units in the drive train upon determination of interruption of the fuel supply, such that the other control units activate an emergency operating strategy for the interruption of fuel supply.

14. The method according to claim 12, further comprising the step of preventing with the transmission control unit a ratio change in the transmission upon determination of interruption of the fuel supply until the malfunction has been remedied.

15. The method according to claim 12, further comprising the step of sending, with either the engine control unit or a vehicle master computer, a control signal to the transmission control device upon determination of the interruption of fuel supply which will prevent any ratio change of the automatic transmission until the malfunction has been remedied.

16. The method according to claim 15, further comprising the step of informing the driver at least one of optically and acoustically of the malfunction.

17. The method according to claim 10, further comprising the step of recognizing, upon determination of a malfunction in a data transfer path of the control devices, a shifting intention of the driver (e.g. intended downshift) signaled by a released gas pedal on a basis of a signal curve of the torque sensor on at least one of the transmission input shaft, the actuating elements and the sensors, and the gearshift is initiated with disengagement of a shift clutch, deactivation of a current transmission ratio and subsequent engagement of the shift clutch; that subsequently either a desired engine speed or transmission input speed signaled by repeated pedal activation for a new lower gear for a current driving speed is inferred from the signal curve of the torque sensor, and subsequently engaging the new gear.

* * * * *